United States Patent Office 3,183,435
Patented May 11, 1965

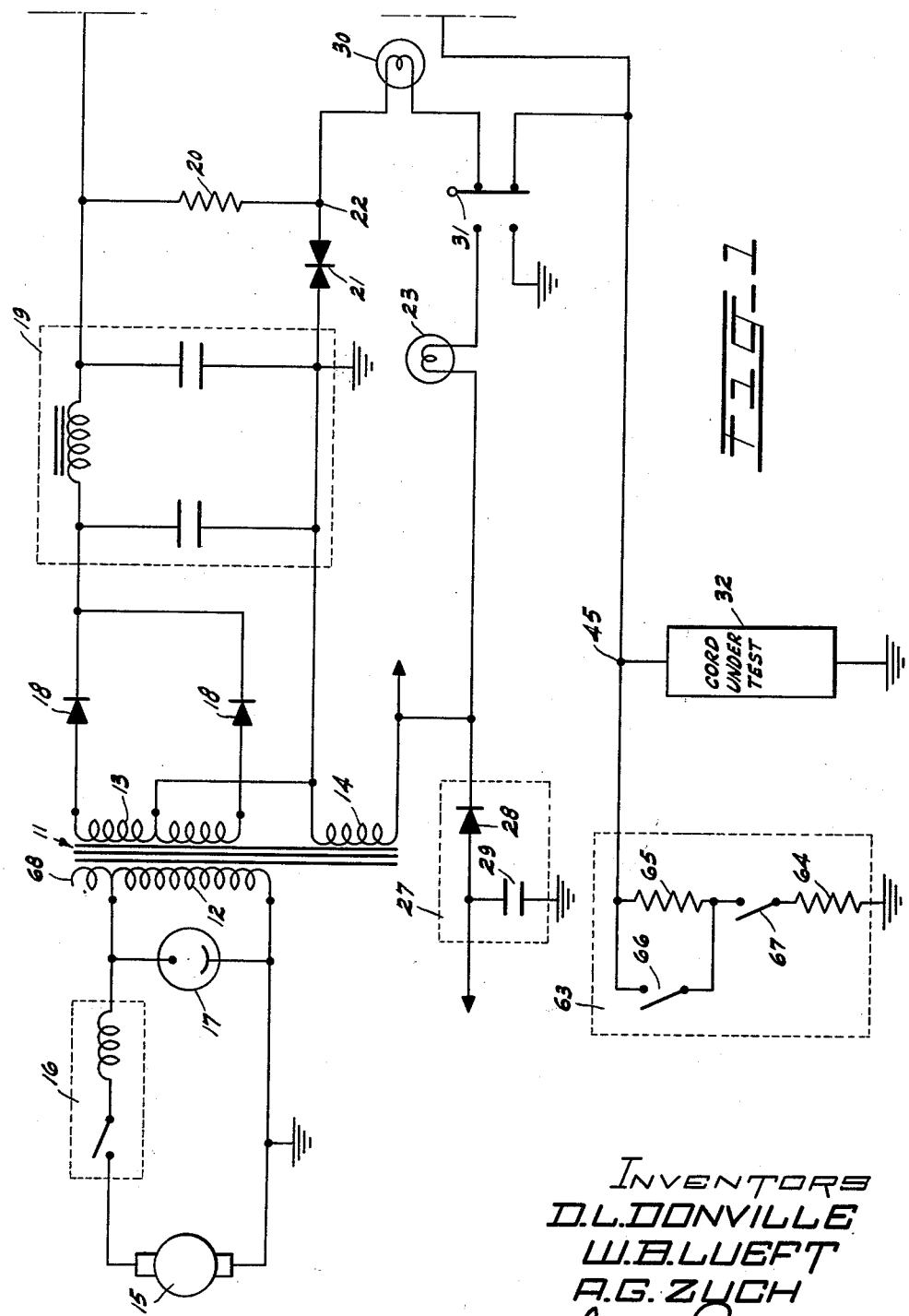

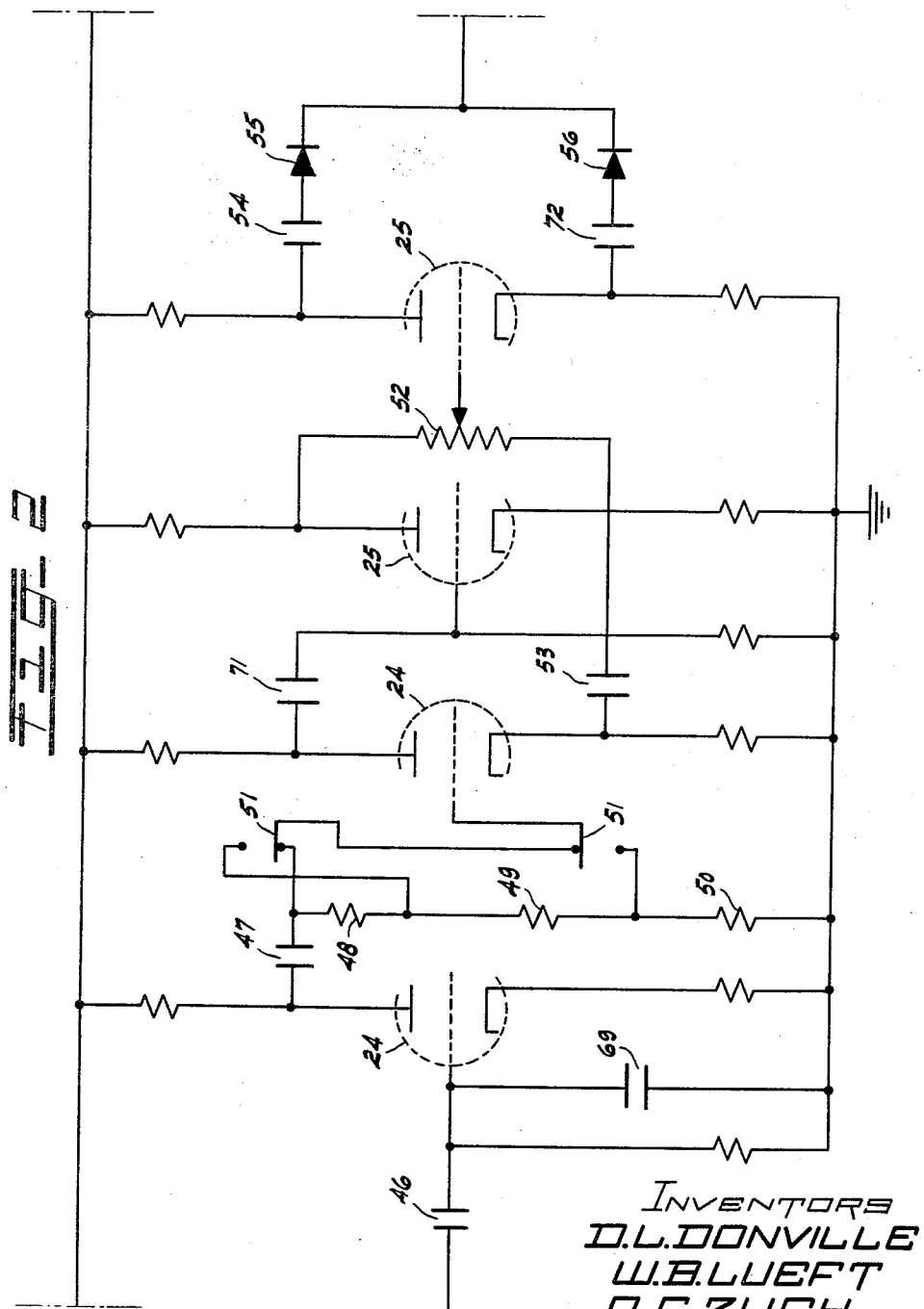

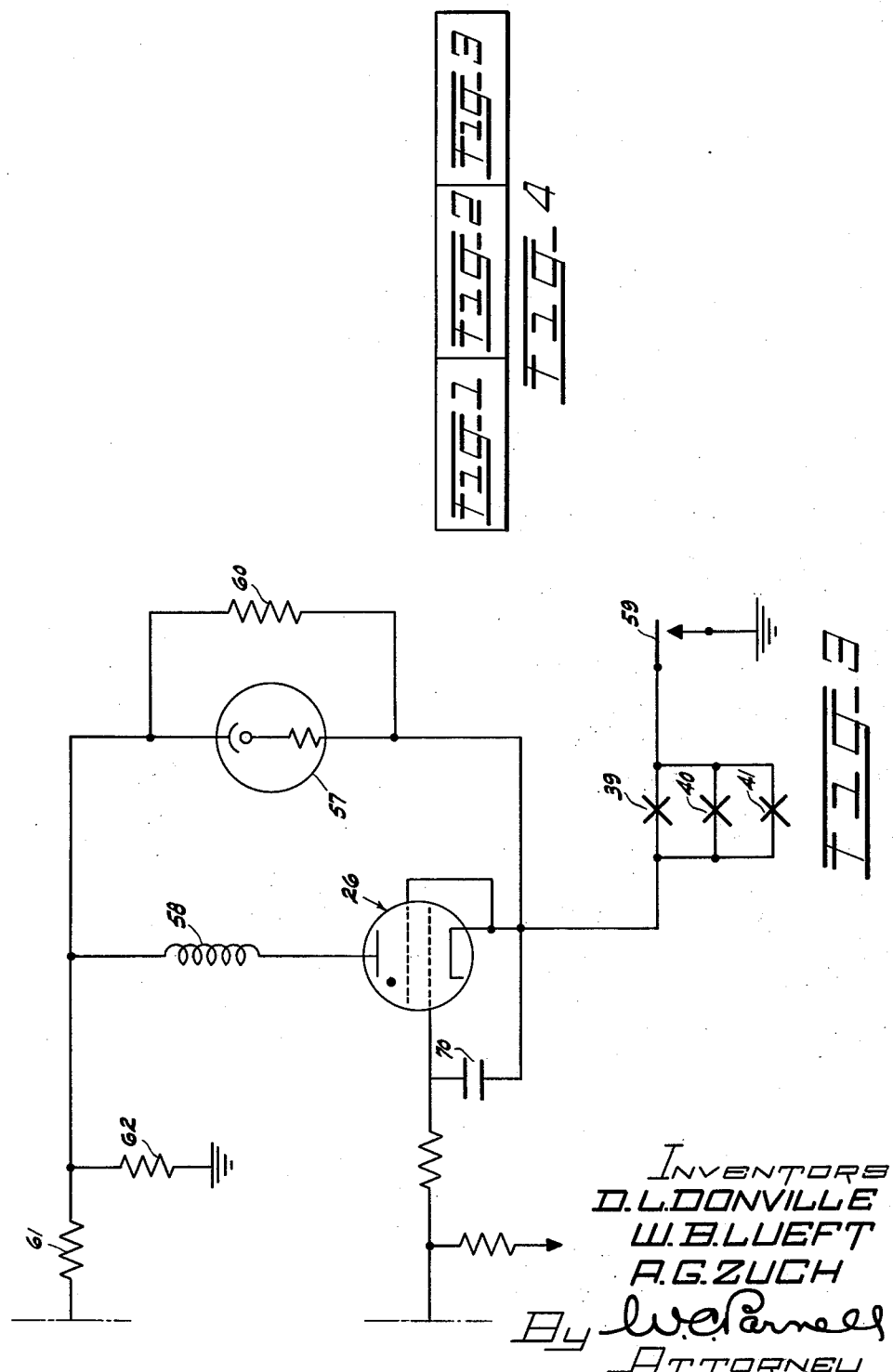

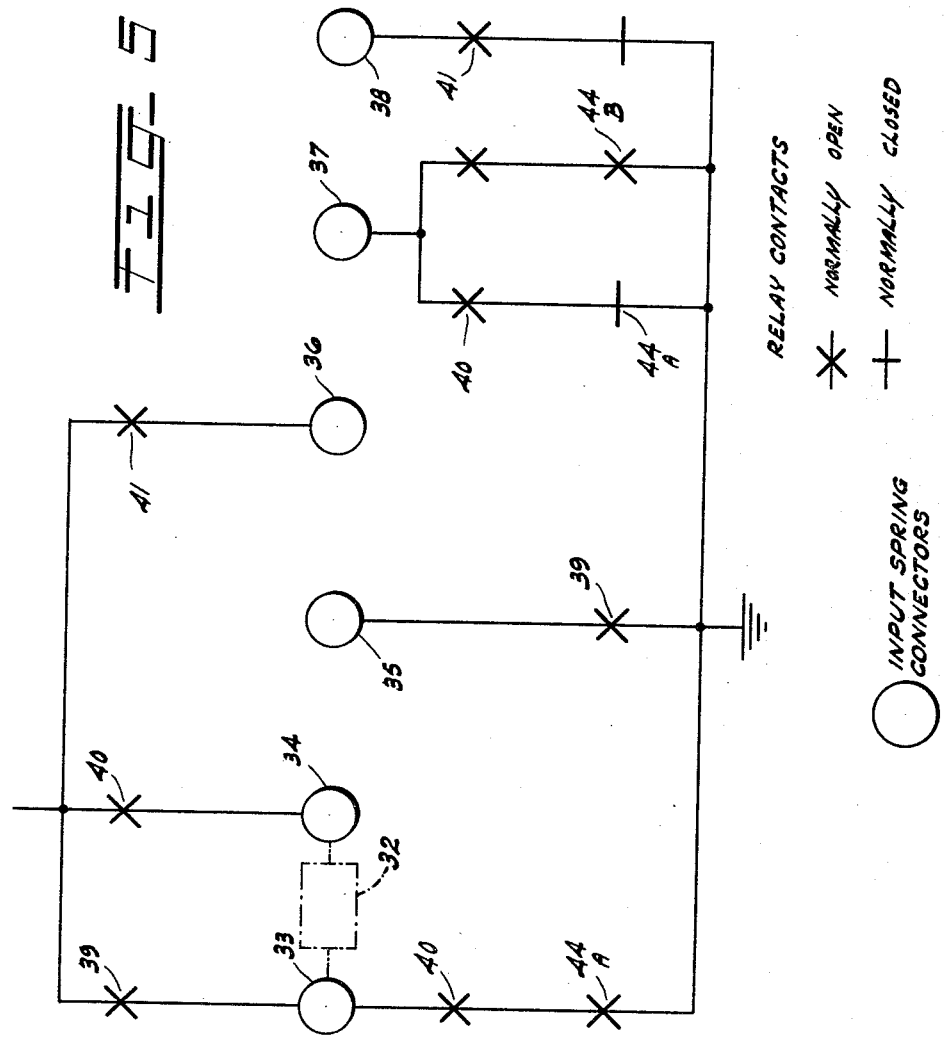

3,183,435
APPARATUS FOR TESTING STRANDED CONDUCTORS UTILIZING PULSES ORIGINATING IN THE CONDUCTORS UNDER TEST
David L. Donville, Seaford, Walter B. Lueft, North Merrick, and Arthur G. Zuch, White Plains, N.Y., assignors to Western Electric Company, Incorporated, New York, N.Y., a corporation of New York
Filed May 10, 1960, Ser. No. 28,124
2 Claims. (Cl. 324—51)

This invention relates to test sets for evaluating resistance changes and particularly to test sets for determining intermittent resistance changes in stranded electrical conductors.

Stranded cables in which a number of wires are collected to form a rope-like bundle are commonly used in structural and electrical applications. Occasionally individual strands of such cables break or separate because they are exposed to larger stresses than neighboring wires, or due to inherent weaknesses, or, perhaps, resulting from failure of a juncture such as a solder connection. Structurally, these defects are significant as they indicate a diminution of strength and presage an increasing rate of strand breakage leading very likely to ultimate failure of the cable since the stress on unseparated strands increases. Electrically, these defects cause locally increased resistance accompanied by increased heat dissipation in lines carrying an appreciable load; in communications systems, the intermittent engagement and disengagement of the separated ends produce resistivity changes which generate pulses and introduce noise into the system.

Both in the structural and electrical manifestations of this problem, the extent of physical severance of the strands are proportional to a resistance change if the opposing ends of the separated strands intermittently make contact, provided that the strands are electrical conductors. However, determining the precise value of the resistance change and, therefore, the exact extent of strand separation is an unnecessarily refined measurement for many purposes and wasteful of resources. Practically, when the requirements for a cable or analogous article in a system or situation are known, it is necessary only to learn whether or not the cable with the broken strands is, nevertheless, still adequate for that purpose: whether the boundary line between adequacy and inadequacy has been crossed.

It is an object of the invention to provide a test set which effectively determines whether the permissible limits of resistance change have been exceeded in cables or other devices having an analogous variation.

According to one embodiment, the test circuit includes a direct current signal source connected in series with the device under test. When the item is shaken causing the broken or separated strand ends to make intermittent contact and change resistance, a pulse originates in the item. A pulse amplifier is coupled to the item by circuitry which blocks the direct current but passes the pulse. After amplification, the pulses, either positive or negative, are rectified and the rectified pulse is fed to a trigger circuit which is fired by a pulse exceeding one caused by the maximum allowable resistance change. The trigger circuit operates a warning system to indicate that the test item is unacceptable.

This and other objects and aspects of the invention will be more readily understood from the following detailed description taken in conjunction with the accompanying drawings in which:

FIGS. 1 to 3 are a schematic diagram of a preferred embodiment of a test set according to the invention;
FIG. 4 indicates the proper arrangement of FIGS. 1 to 3;

FIG. 5 is a switching system which may be used in conjunction with FIGS. 1 to 3 to provide a refinement of the invention.

The embodiment of the invention shown in FIGS. 1 to 3 when arranged as shown in FIG. 4 is particularly useful and efficient in testing telephone desk and handset conductors for broken strands which, as the set is moved, may produce an excessive amount of noise. FIG. 1 shows a plate voltage and cord current supply with a power transformer 11 having a 115-volt primary winding 12, a 290-volt center taped secondary 13 and a 6.3-volt secondary 14. The 115-volt 60-cycle input source 15 is connected to primary 12 and a combination circuit breaker and on-off switch 16. The presence of input power is indicated by neon pilot light 17. D.C. plate voltage of 165 volts is obtained from secondary 13 after full wave rectification and filtration by silicon diodes 18 and filter 19. A permanent load consisting of resistor 20 and zener diode 21 appears across the output of filter 19. The current for testing the telephone set cords, approximately 200 milliamperes, is obtained at junction 22 of resistor 20 and diode 21. The function of zener diode 21 is to limit the voltage across the contacts to which the telephone set cords under test are connected, to 24 volts D.C. when no cord is connected. With a cord connected, diode 21 has a very high resistance and has slight effect on the circuit.

The lower secondary 14 of transformer 11 supplies filament voltage, 6.3 volts A.C., to the three tubes 24, 25 and 26 in the circuit and also supplies power for bad lamp 23. This same voltage is rectified and filtered by unit 27 which includes germanium diode 28 and capacitor 29. Unit 27 is a half-wave rectifier supplying a negative 8.6 volts D.C. used for biasing the grid of thyratron tube 26 (FIG. 3).

The 200 ma. test current from junction 22 passes through good lamp 30 when relay 31 is in its normal right-hand position, to the input of a single conductor under test or, if a number of conductors are being tested, to a switching circuit; both possibilities are indicated by 32. One switching circuit 32 shown in detail in FIG. 5 is extremely practical for the rapid testing of telephone set cords. In telephone sets the principal interest as far as noise is concerned is in the talking paths from the handset transmitter or speaker. In sets having two or more talking paths, all of these may be tested from the open end of the line which leads into the set, for example, from a wall connection into a desk set. A shorting tool is placed in the transmitter or speaker bowl of the handset so that several complete circuits start at the open end of the line, extend through the desk set, through the handset cord to the transmitter, through the shorting tool in the transmitter bowl and out through another wire, through the handset cord, desk set and line back to the open end. The several line cord wire ends may be connected at random to input springs 33–38 in the external switching circuit. The cord noise test is then performed between various combinations of input springs by the operation of relays or switches in said circuit as indicated in the following table:

| Relay or Switch Operated | 44 Position | Cord Noise Test Between Input Springs |
|---|---|---|
| 39 | Normal | 33 and 35. |
| 40 | A | 33 and 34. |
| 40 | Normal | 34 and 37. |
| 41 | B | 36 and 37. |
| 41 | Normal | 36 and 38. |

The 200 milliampere D.C. cord current flows through the good lamp 30, the switching circuit (FIG. 5), if one is used, and through the cord under test to ground. This path not only supplies cord test current but also indicates continuity, for if one of the cords under test were open, there would not be a complete circuit and the good lamp 30 would not light. Resistor 20 is high with respect to the cable under test so that any differences between various cables would have a negligible effect on the circuit. With constant line voltage, this circuit provides an effectively constant current despite differences in the resistance of the items to be tested.

With a cable connected and cord current flowing through it, there is a steady D.C. voltage at terminal 45. Shaking the cord causes broken or separated strand-ends to rub against each other and ultimately make and break contact. The resistance change which occurs with this intermittent action can have different maximum allowable limits. For example, in one telephone set the allowable resistance change is ⅛ ohm while in other sets the allowable limit is $\frac{1}{16}$ of an ohm. With a 200 milliampere test current flowing through the cord and a $\frac{1}{16}$-ohm change, the voltage from terminal 45 to ground will vary from its steady value by 12.5 millivolts. This voltage change can be either positive or negative depending upon whether the cord resistance increases or decreases with shaking. The pulse voltage is coupled to the grid of the left-hand side of vacuum tube 24 through capacitor 46 which blocks the steady D.C. voltage at junction 45 from appearing at the tube 24 grid.

The left half of tube 24, a duo-triode, is a Class A preamplifier for the input pulse. Both halves of tube 24 are normally conducting and, depending on the polarity of the pulse, the tube current will increase or decrease.

The right half of tube 24 and the left half of tube 25 constitute a negative feedback amplifier in which both halves are normally conducting. The pulse at the left-hand plate of tube 24 is coupled to the grid of the right-hand portion of tube 24 by means of capacitor 47 and attenuator network composed of resistors 48, 49 and 50 which is controlled by three-position key 51. With the switch or key 51 in its normal position, the lower contact of the upper portion and the upper of the lower portion are operative and the pulse is not attenuated. A positive pulse on the grid of the left half of tube 25 produces an increase in the tube current which causes a negative pulse to be fed back through the calibration potentiometer 52 and capacitor 53 to the cathode of the right half of tube 24. This negative feedback causes a reduction of amplifier gain but improves stability of the circuit.

The right half of vacuum tube 25 is a full wave pulse rectifier or a phase inverter circuit which is normally conductive. A portion of the pulse appearing across the calibration potentiometer 52 is applied to the pulse rectifier grid. It will be evident that the setting of potentiometer 52 determines the level of the pulse at the grid of the pulse rectifier tube 25. With a negative pulse on the rectifier grid, the plate voltage of the right half of tube 25 increases with a decrease in plate current while the cathode voltage decreases. The positive pulse at the plate is coupled through capacitor 54 and germanium diode 55 to the grid of thyratron tube 26. The negative cathode pulse is not coupled to the grid of tube 26 because of the full rectifier action of diodes 55 and 56 which will pass only positive pulses. If a negative rather than a positive pulse appears on the grid of the left-hand side of tube 24, all the current and voltage changes are in the opposite directions. A positive pulse would consequently appear at the cathode of the right-hand section of tube 25 which would be passed by diode 56 while the accompanying negative pulse at the plate would be blocked by diode 55. In this way, negative and positive input pulses from the resistance changes in the cord are amplified but always result in a positive pulse being applied to the grid of thyratron tube 26.

The principal components of the trigger and the indicating or alarm circuit in the present embodiment are the thyratron gas tube 26, a switch-on lamp 57, bad lamp 23, good lamp 30, and relay coil 58 for operating the contacts of relay 31. The rectified pulses from the diodes 55 and 56 are fed to the grid of thyratron 26. In addition, a negative 8.6 volts D.C. bias is also applied to the thyratron grid from the filter rectifier unit 27. When the positive pulses are large enough to overcome the negative bias, the tube triggers and starts to conduct. The cathode of tube 26 is connected to ground through ring foot switch 58. In the event that a switching circuit similar to that shown in FIG. 5 is used, parallel, normally open contacts of switches 39, 40 and 41 are automatically serially connected in the line before the foot switch as shown in FIG. 3. This thyratron cathode ground circuit must be completed before the thyratron tube can conduct and this can only occur when foot switch 59, one of relays 39, 40 or 41 are concurrently operated. When the foot switch 59 is operated, the switch-on lamp 57 circuit is also completed and lamp 57 will light, indicating that the foot switch is closed and that ground has been applied to the cathode of thyratron 26. Resistor 60, in parallel with lamp 57, prevents leakage current from lighting the lamp. A voltage divider made up of resistors 61 and 62 is used to reduce the B+ voltage of 165 volts to a suitable value for reliable operation of the thyratron 26 and the switch-on lamp 57.

Calibration control potentiometer 52 is adjusted to the point where the resulting pulse on the grid of thyratron 26 due to, in this case, the $\frac{1}{16}$-ohm maximum allowable cord resistance change is just large enough to overcome the 8.6 volt D.C. bias. When the thyratron fires, relay coil 58 in the thyratron plate circuit operates relay contact 31 and, as shown in FIG. 1, the good lamp 30 shuts off and the bad lamp 23 lights. Bad lamp 23 will remain lit until the ring foot switch 59 is released. Of course, if the resistance change in the shaken cord is less than the maximum allowable limit for which calibration potentiometer 52 has been set, the thyratron grid pulse will not overcome the grid bias, the thyratron will not fire and conduct, and in consequence, the good lamp 30 will remain lit.

The attenuator circuit (including resistors 48, 49 and 50 and three-position switch 51 through which the pulses from the plate of the preamplifier of left-hand section of tube 24 are fed to the input grid of the feedback amplifier right-hand section of tube 24) is an adjustment for test items of different resistivity. For example, one type of telephone set includes a serially connected input line and handset cord. The combined line and cord have an effective 70-ohm resistance and a $\frac{1}{16}$-ohm maximum allowable resistance change. The handset alone has an approximate effective resistance of 9 ohms and depending on the type of handset may have either a $\frac{1}{16}$-ohm or ⅛-ohm maximum allowable resistance change. Since the handset has a lower resistance (9 ohms) than the combined telephone set (including input line) and handset (70 ohms), the pulse for any given resistance change would be larger for the handset alone than for the complete telephone and handset combination. To adjust for these differences, the pulse is coupled through capacitor 47 to the attenuator network. With both sections of the key 51 in the upper position, a small portion of the pulse is attenuated across resistor 48. The pulse applied to the grid of right-hand side of tube 24 is then the same value for the handset and the telephone set. The pulse must also be adjusted for the difference in maximum allowable resistance change in different types of handsets (⅛ and $\frac{1}{16}$ ohm respectively). With both the upper and lower keys 51 in the lower position the pulse to the feedback amplifier grid right-hand side of tube 24 is cut in half by the divider action of resistors 49 and 50 and brings the grid pulse for the different wires under test to the same level for the maximum permissible resistance change.

Since the attenuator circuit makes the different classes of apparatus to be tested appear alike, it is necessary to calibrate the test set only for one of these items. Built-in calibration check 63 has resistor 64 which represents in this case, a telephone set and handset combination having a 70-ohm resistance. Resistor 65 in parallel with noise switch 66 simulates 1/16 of an ohm maximum resistance change. Closing the calibration check switch 67 in series with resistor 64 has the effect of connecting a telephone to the test set, and operating noise switch 66 introduces the maximum allowable 1/16-ohm change. Calibration potentiometer 52 is adjusted to the point where the bad lamp 23 lights when calibration check switch 67, foot switch 59, noise switch 66 are operated in this order. This check must be made without a device 32 in the circuit since paralleling the built-in calibration with the device to be tested would affect the calibration. The proper sequence of operating the switches must be adhered to as with an open calibration check switch 67 there is an infinite impedance from junction 45 to ground. If the foot switch and the noise switch were connected prior to switch 67, the great resistance change would operate the bad lamp even if the actual resistance change in the test cord did not exceed the allowable limit.

The circuit is capable of reliable operation at other values than the indicated 115-volt line voltage. For example, an increase of line voltage to 120 volts will cause a proportionate increase in the B+, cord current, and input pulses to the preamplifier. The pulse amplification and grid bias to the thyratron tube will also vary proportionately. As a result, the calibration of the set will be maintained. Similar automatic compensation will occur when the voltage is low. However, for purposes of operating the vacuum tubes at their rated value, it may be advisable that the primary side of input transformer 11 be increased by using the untapped coils 68.

For certain applications, as in the testing of telephone cords by which the invention has been illustrated, it is desirable to eliminate objectionable noise which may falsely trigger the test set. Filters have been, therefore, built into the test set to prevent the interference of random noise generated by flourescent lights and other fixtures. Capacitors 69 and 70 are R.F. noise bypass filters which provide a low resistance path to ground for such interference and prevent circuit operation from the noise. Very low frequency noise and line surges are prevented from affecting the set by using coupling, for example, capacitors 47, 54, 71 and 72, of 0.01 microfarad to block this noise from the two grids.

It is to be understood that the above described arrangements are purely illustrative of the application of the principles of the invention. Other circuit elements may be substituted for those described and still accomplish purposes of the invention. For example, a relay and hold circuit could be substituted for the thyratron circuit. Numerous other arrangements may be readily devised by those skilled in the art which will embody the principles of the invention and fall within its spirit and scope.

What is claimed is:

1. In an electrical system for detecting variations in resistance value of a multi-strand cable as it is continually flexed,
   a voltage divider comprising a resistor in a first branch and the multi-strand cable in the second branch,
   a source of D.C. potential connected to the termination of the first branch,
   a source of ground potential connected to the termination of said second branch,
   a Class A amplifier connected to the junction of said first and second branches and responsive to variation in potential at said junction point due to changes in resistance of said second branch resulting from the flexing of said multi-strand cable for producing output pulses varying in magnitude and direction in accordance with said changes,
   a cathode follower amplifier connected to said Class A amplifier and operated in accordance with said output pulses,
   a rectifier means connected to the cathode and the anode of said cathode follower for producing positive going pulses in response to variations in potential of said cathode and anode,
   a thyratron connected to said rectifier means,
   means for biasing said thyratron from conduction until the magnitude of the pulses from the cathode follower exceed a predetermined value indicative of a faulty multi-strand cable, and
   an indicator operated by said thyratron for indicating that cable being flexed is faulty.

2. In an electrical system for determining resistance value changes in a multi-strand wire that is subjected to flexion,
   a voltage divider circuit having a resistor and power source connected in a first branch and a multi-strand wire connected in the second branch,
   means connected to the junction of said first and second branches for generating positive and neagtive going pulses in accordance with variations in resistance of said flexing multi-strand wire,
   means responsive to said positive and negative going pulses for producing unidirectional pulses,
   indicating means,
   means responsive to pulses that exceed a predetermined magnitude for operating said indicating means,
   a calibration circuit including a switch connected to said pulse generating means in place of said multi-strand wire,
   said calibration circuit including a pair of resistors connected in series, a first of which is representative of a desired predetermined value of the multi-strand wire and the second of which is representative of a tolerable variation in resistance of the multi-strand wire as it is flexed,
   means for selectively connecting the second resistor into and out of the circuit to operate the pulse generating means, and
   means for adjusting the pulse responsive means to be non-responsive to pulses generated by connection of said second resistor into said calibration circuit and to be responsive to pulses generated by connection of any resistor having a value exceeding the value of said second resistor.

References Cited by the Examiner

UNITED STATES PATENTS

| 2,678,387 | 5/54 | Volz | 328—26 |
| 2,801,333 | 7/57 | Jordan | 317—149 |
| 2,832,915 | 4/58 | McCoy | 317—149 |
| 2,958,823 | 11/60 | Rabier | 324—62 X |

FOREIGN PATENTS

| 358,677 | 10/31 | Great Britain. |
| 767,558 | 2/57 | Great Britain. |
| | | (Dup. of Swiss Patent 332,529) |
| 332,529 | 10/58 | Switzerland. |

WALTER L. CARLSON, *Primary Examiner.*

LLOYD McCOLLUM, SAMUEL BERNSTEIN,
*Examiners.*